J. SARGENT.
Traps for Drains, Sewers, &c.
No. 200,093. Patented Feb. 5, 1878.
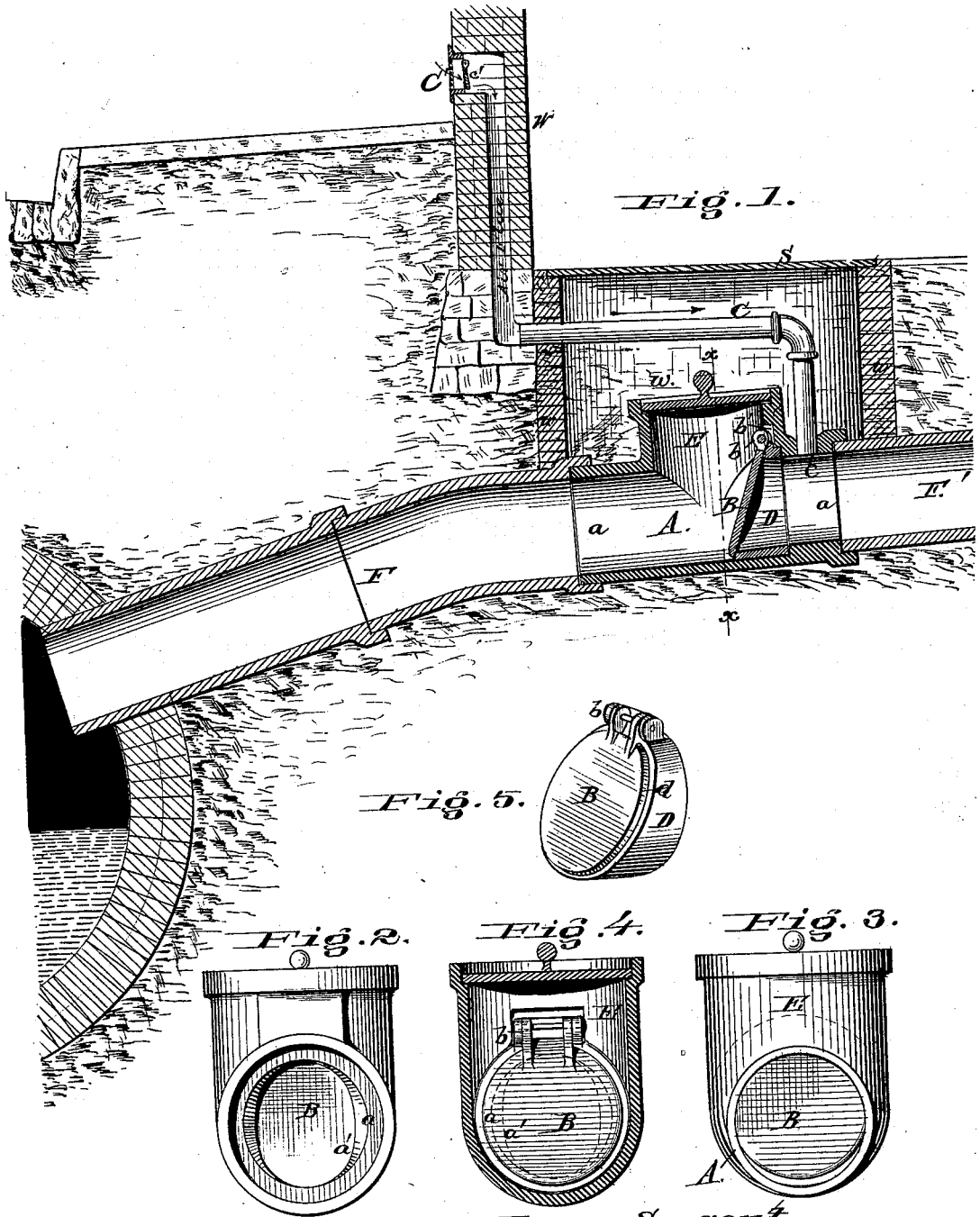

UNITED STATES PATENT OFFICE.

JAMES SARGENT, OF ROCHESTER, NEW YORK.

IMPROVEMENT IN TRAPS FOR DRAINS, SEWERS, &c.

Specification forming part of Letters Patent No. 200,093, dated February 5, 1878; application filed January 26, 1878.

*To all whom it may concern:*

Be it known that I, JAMES SARGENT, of Rochester, in the county of Monroe and State of New York, have invented certain new and useful Improvements in Traps for Drains, Sewers, &c., of which the following is a specification:

This invention relates to an improvement in that class of devices the purpose of which is to prevent back-flow and escape of sewer-gases and foul air from sewers through drain and waste pipes connected therewith.

Its object is to provide for this purpose a trap or valve adapted for application to a line of pipe already laid or at the original laying thereof.

It consists, first, in a section of sewer or drain pipe, provided with an interior gate or valve, and having its inner area on the outward side of said gate circular in cross-section, while on the inward side of said gate the cross-section of said area is elliptical, whereby the current of drainage is contracted in width and rendered deeper, increasing its head so that solid matter will not be liable to lodge at or be prevented from opening and passing the gate; second, in a section of drain-pipe, provided with an interior gate opening in the direction of the flow, and adapted at its inward portion for connection with a pipe for conducting air into a line drain-pipe at the rear of the gate, whereby sewer-gases and foul air are prevented from escaping from a sewer through the line of pipes leading from a house, and instead pure air is received into said drain-pipe; third, in the combination, with a section of drain-pipe, having its opposite end openings in the same longitudinal plane, and its inward portion contracted, of a gravity gate or valve, provided with separate inclined jamb or bearing, adapted for insertion and removal at will, whereby the gate may be easily removed for repair, and the construction of the whole rendered easier than if the hinge-bearings and jambs were cast or molded with the section; fourth, in the combination, with a drain-pipe, of a gravity gate or valve, arranged to open in the direction of the sewer, but prevented from opening in the opposite direction, an air-pipe leading from said drain-pipe at the rear or house side of its gate, and a valve arranged in said air-pipe, and adapted to open inwardly for the inflow of fresh air, but prevented from opening outwardly, so that gas or foul air, which might accumulate in the drain-pipe at the rear or house side of the drain-gate, may not escape therethrough.

In the accompanying drawings, Figure 1 represents a vertical central section of a line of drain-pipe leading to a sewer. Fig. 2 is an inward end view of a section of drain-pipe constructed according to my invention. Fig. 3 is an outward end view of the same. Fig. 4 is a section on line *x x*, Fig. 1. Fig. 5 is a view of the gate and its bearing detached.

In the drawing, W designates a house-wall, and S the floor of a cellar. The letter A indicates a section of a drain-pipe, from which a man-hole, E, opens upward. The outward portion *a* of this section, as shown in Fig. 3, and the inward portion *a'*, has an elliptical cross-section, as shown in Fig. 2.

B is a gate or valve, hinged to the narrow portion of the wall of an annular band or short tube, D, one end of which is beveled, as shown at *d*, to afford an inclined bearing, upon which the gate B, by gravity, will lie snugly against and keep the pipe-passage closed, except when the flow of drainage forces it open in finding its way to the sewer. This gate and its jamb or bearing are formed separately from the section of pipe A, and afterward inserted, a recess, *b'*, being cut in the wall of the man-hole for the reception of the ears *b* of the jamb or bearing.

On the inward side of the gate the section of pipe A has a hole, *c*, cut in its wall, and into this hole fits the end of a pipe, C, which leads into an air-passage, C', opening above the surface of the ground, and provided with a delicately-hung gravity flap-valve, *c'*, arranged to open inward, to receive and conduct fresh air to the rear of the gate B, but prevented by its jamb from opening outward, so that foul air may not escape through the pipe in case the gate B should fail to close perfectly, or, from any other cause, such air as sewer-gas should accumulate at the rear of the drain-gate. By means of this pipe C pure air is conducted into the drain-pipe between the gate and the inlet end of the drain-pipe, while by the gate B sewer-gases and foul air are prevented from escaping from the sewer through the drain-pipe and finding their way to the house from which the drain-pipe leads. This gate also prevents the back-flow of drainage in case of flushing of the sewer.

In applying my invention to a line of drainpipe, I prefer to locate the valve-section below the cellar-floor, under which I dig a pit of suitable depth, and, after connecting the valve-section, I wall up said pit, as shown at $w\ w$, Fig. 1, and cover it by a suitable trap-door, forming a portion of the cellar-floor, or by other suitable means. I thus provide ready access to the man-hole and gate, and obviate the necessity of digging a second time.

The object of constructing the inward portion of the section, or that portion through which the water flows immediately before striking the gate, with a less diameter than that of the remainder of the pipe in the line, is to reduce the friction, and thereby increase the force with which the current strikes the valve, and to give a greater depth of water in the valve-section than at any other portion, so as to insure the passing through the gate of any floating articles or matter carried thither by the drainage.

By constructing the gate B and its jamb or bearing separate from the other portion of the pipe-section, said gate and bearing are rendered easily removable for repair, and the difficulty of casting or molding the section with ears or hinge-bearings avoided. Said gate and its bearing may also be applied to an ordinary man-hole section of drain-pipe, and secured therein by cement.

Though I have shown and described this gate and bearing as constructed separate from the pipe, I may form the pipe-section with an inclined ledge and suitable ears or hinge-bearings, to which the gate may be connected. And, further, I would say that I do not confine my improvement to a man-hole section of drain-pipe, though in practice I prefer to use such a section for its application. Nor am I limited to the precise arrangement of the air-supply pipe shown, as this arrangement will depend a great deal upon the locality of the line of drain-pipe.

Drain-pipes have heretofore been provided with valves or gates for the same general purpose of the valve in my invention; but, so far as I am aware, the section of pipe to which the gate has been applied has been only adapted to connect two lines of pipe laid at different levels, said gate opening toward the lower level.

What I claim is—

1. A section of sewer or drain pipe provided with an interior gate or valve, and having its inner area on the outward side of said valve or gate circular in cross-section, while on the inward side of said gate the cross-section of said area is elliptical, and of less transverse diameter than the outward end, substantially as and for the purpose set forth.

2. A section of drain-pipe provided with an interior gate opening in the direction of the flow, and adapted at its inward portion for connection with a pipe for conducting air into a line of drain-pipe at the rear of the gate, substantially as and for the purpose set forth.

3. The combination, with a section of drain-pipe having its opposite end openings in the same longitudinal plane, and its inward portion contracted, of a gravity gate or valve provided with a separate inclined jamb or bearing, adapted for insertion or removal at will, substantially as and for the purpose set forth.

4. The combination, with a drain-pipe, of a gravity gate or valve arranged to open in the direction of the sewer, but prevented from opening in the opposite direction, an air-pipe leading from said drain-pipe at the rear or house side of its gate, and a valve arranged in said air-pipe and adapted to open inwardly, but prevented from opening outwardly, substantially as and for the purpose set forth.

In testimony that I claim the foregoing I have hereunto set my hand in the presence of the subscribing witnesses.

JAMES SARGENT.

Witnesses:
JAMES L. NORRIS,
JAMES A. RUTHERFORD.